United States Patent Office 3,344,614
Patented Oct. 3, 1967

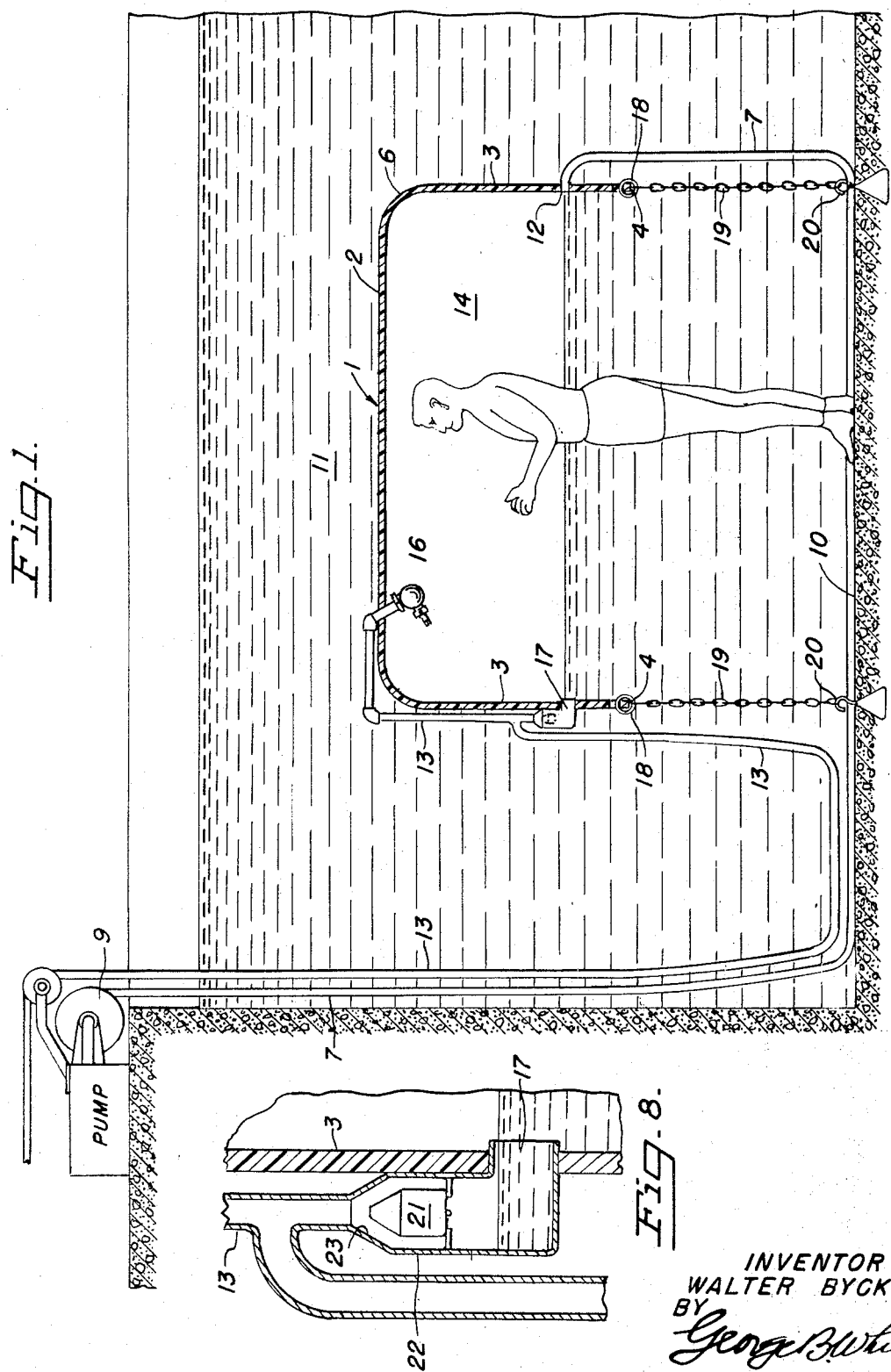

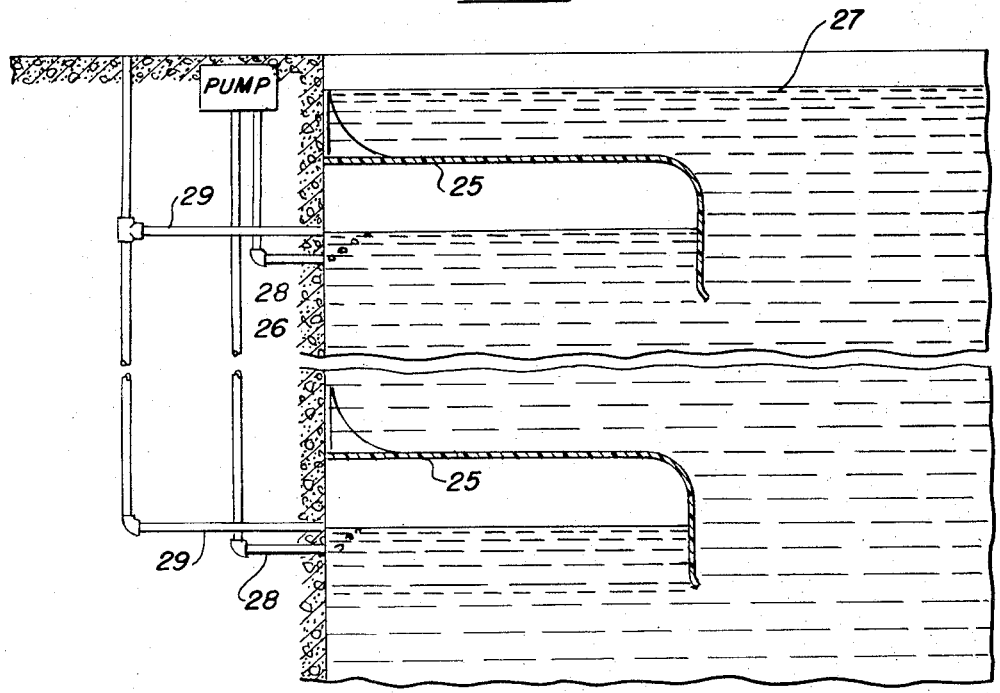

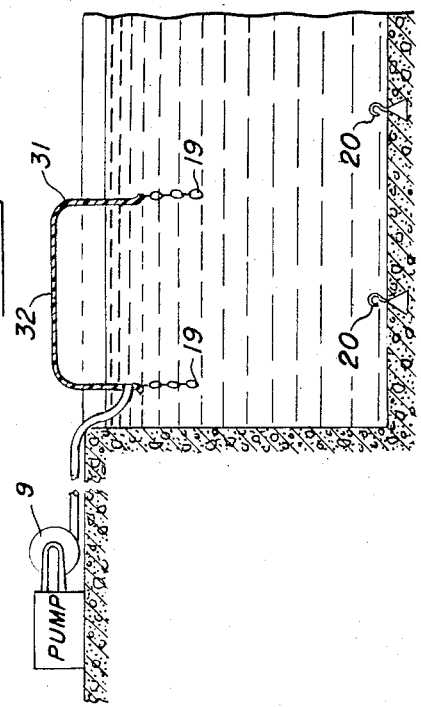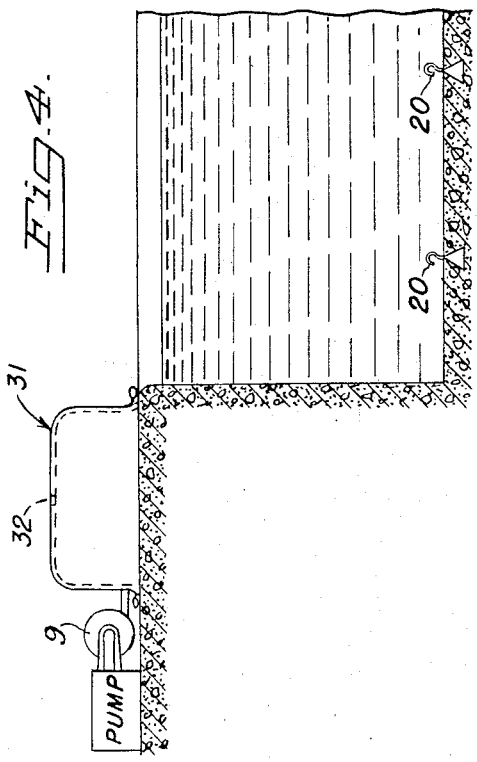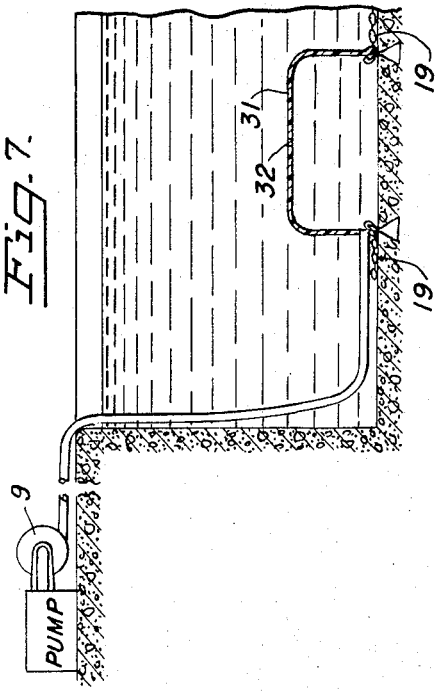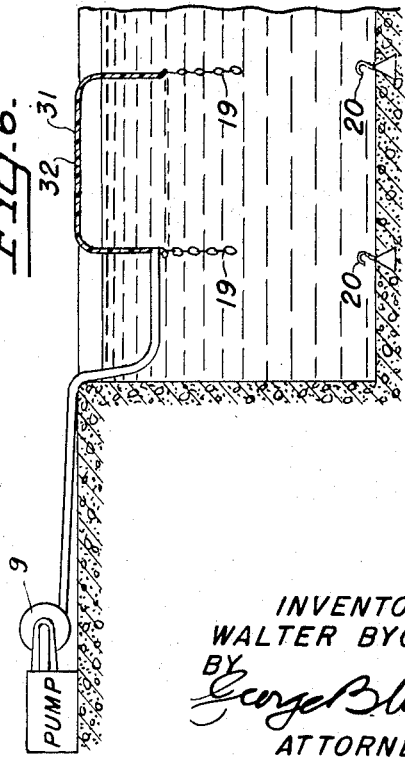

3,344,614
UNDERWATER OBSERVATION BELL CHAMBER
Walter Byck, 121 St. James Drive,
Santa Rosa, Calif. 95401
Filed Oct. 4, 1965, Ser. No. 492,623
4 Claims. (Cl. 61—69)

ABSTRACT OF THE DISCLOSURE

An underwater observation bell chamber for the use of swimmers in swimming pools for water sports and amusement, including transparent dome, open at the bottom, and detachable anchoring lines anchored from below to hold the dome spaced from the bottom and allow swimmers to swim into the dome from the bottom up. An air pump and exhaust system assures safe gas composition inside the dome or bell above the water level, including means for releasing air from the bell chamber in a predetermined ratio between the intake and release for a substantially constant air condition, the volume of intake flow exceeding the volume of out flow, the release of air being controlled by normally closed valve means openable by the lowering of the water level.

Brief description of the invention

A light, buoyant, transparent dome, open at the bottom for the use of swimmers in swimming pools and the like places for water sports and amusement; so anchored as to provide entry at the bottom; combined with air pump and exhaust system balancing the intake and exhaust in predetermined proportion to assure safe gas composition inside the dome or bell above the water level and controlled in such manner as to facilitate the raising, lowering and installation and use of the device; the dome or pull being so anchored from below as to space it from the bottom of the water body and also to leave the transparent lightweight dome unencumbered.

Brief description of the drawings

FIG. 1 is a somewhat diagrammatic view of the installation of the dome in a swimming pool.

FIG. 2 is a somewhat diagrammatic view of the modified permanent installation of the dome.

FIG. 3 is a somewhat diagrammatic sectional view of a simplified form of the dome.

FIGS. 4, 5, 6 and 7 indicate the steps of a method of installation of the dome in a swimming pool.

FIG. 8 is a sectional detail view of an enlarged scale of a float valve in the lower exhaust of FIG. 1.

The dome or bell 1 is made of a transparent material such as plastic of suitable structural strength and it preferably has a substantially flat top 2 with sides 3 substantially perpendicular to the top 2. The bottom of the dome defined by the rim edges 4 of the sides 3 is completely open. It is preferable for the purpose of withstanding the pressure on the bell that the corners 6 of the dome be suitably rounded.

A supply conduit 7 is extended from an air pump 8 located on the bank of the swimming pool. It is preferable that the conduit 7 be a flexible hose held on a suitable winch roller 9 to facilitate the winding and unwinding of the conduit 7 while the dome or bell 1 is raised or lowered respectively. The conduit 7 should be of sufficient weight or be so weighted that it would rest on the bottom 10 of the swimming pool 11. The supply conduit 7 is connected to the bell 1 at an air intake port 12, which in the illustrative embodiment is at the predetermined water level in the bell 1.

An exhaust conduit 13 is connected to a suitable portion of the dome 1, in this illustration, through the top 2 of the dome 1 near a corner 6 thereof so as to conduct air from the air space 14 of the dome 1 to the atmosphere. In this form an exhaust valve 16 is provided at or near the end of the exhaust conduit 13, in this illustrative embodiment within the dome 1, which is pre-adjusted to a fixed rate of air flow sufficiently high to assure an air flow which is safe during maximum usage of the dome. The intake flow through the intake port 12 must exceed the aforesaid preset rate of outflow or exhaust. The water level in the dome is maintained at a predetermined level by the use of a secondary exhaust 17 which is located in this embodiment on the side of the dome 1 at said predetermined level. This secondary exhaust 17 and the exhaust conduit 13 are considerably larger than the intake port 12, thereby to prevent lowering of the water level below the level of the secondary exhaust 17.

The dome is provided with suitable securing elements such as hooks or rings 18 in this illustration near the rim edges 4. Suitable chains or flexible tension members 19 are hooked to or otherwise secured to the rings 18 so that suitable weights or anchors may be applied for holding the dome 1 at the desired depth in the swimming pool 11. In the herein illustration, anchor hooks 20 are imbedded in the bottom 10 of the swimming pool 11 so that they can be engaged by the chains or tension lines 19 to hold the dome 1 at the desired spacing above the bottom 10 of the swimming pool 11.

In the herein illustrative embodiment, the secondary exhaust 17 is connected to the float valve 21 shown in FIGS. 1 and 8. The float valve 21 has a casing 22 in which the float valve 21 floats on water which enters through the secondary exhaust 17 from the adjacent side 3 of the dome 1. When the water level in the dome 1 is at the predetermined level, then the float valve 21 is lowered from its valve seat 23 and permits air communication to the air conduit 13.

In the modified form shown in FIG. 2, the dome 25 is secured to the side wall 26 of the swimming pool 27 and is suitably braced. The intake conduits 28 and exhaust conduit 29 are connected through the side wall 26 of the swimming pool 27. Several such domes 25 may be arranged in this manner spaced from one another so as to permit the swimmers to descend to selected depths.

In the simplified form shown in FIG. 3 the dome 31 is provided with a suitable exhaust opening 32 which allows bubbles 33 to escape, indicating to the person having his head in the dome 31 that the air flow is in order. This form also has the intake conduit 7 and intake port 12.

Any of the removable domes may be lowered by the method shown in FIGS. 4 to 7. The dome is connected to the supply conduit 7 and is placed in inverted position as shown in FIG. 5 on the top of the water level in the swimming pool and then the air is permitted to escape to the atmosphere and thus the dome 31 is gradually sunk as shown in FIG. 6 to the level and then below the level of the water in the swimming pool, until the bell is on the bottom as shown in FIG. 7. In this bottom position the bell can be easily lifted or a slight air pressure may be introduced to lift it sufficiently for the attendant to attach the chains 19 to the hooks 20. Then air is introduced through the supply conduit 7. The air collects in the top of the dome 1 because of the larger volume of air intake than the air exhaust. The dome thus will rise to the desired height at which the constant water level in the dome may be maintained in the manner heretofore described in connection with FIG. 1.

I claim:
1. In an underwater observation bell chamber for swimming pools and the like,
(a) a transparent dome,
(b) a top,

(c) sides extending from the top so as to define the area of the dome, the bottom edges of the sides defining an opening into the dome,
(d) anchor means connected to said sides to anchor the bell at a predetermined distance from the bottom of the swimming pool,
(e) means to conduct air from the outside to the interior of said bell chamber,
(f) means for releasing air from said bell chamber,
(g) the ratio between the air intake and release being predetermined for maintaining a substantially constant air condition in the bell chamber above the water level in said chamber,
(h) the volume of intake flow through said air conducting means exceeding the volume of outflow through said releasing means,
(i) exhaust means at about a predetermined water level in said bell chamber for releasing said excess air volume at about said predetermined level, thereby to prevent the lowering of said water level in said bell chamber to below said predetermined level, and to maintain a substantially constant air exchange in said bell chamber,
(j) normally closed valve means openable by the lowering of the water level to said predetermined level for allowing release of air through said exhaust means.
2. The invention defined in claim 1 and
(h) adjustable means for presetting the volume of air release through said releasing means.
3. The invention defined in claim 1 and
(h) said anchor means including holding elements extending from the bottom of said swimming pool, and releasable connecting elements between said holding elements and the sides of the bell.
4. The invention defined in claim 1 and
(h) said air conducting means including flexible conduits,
(i) a flexible conduit conducting air from said air releasing means to the atmosphere.

References Cited
UNITED STATES PATENTS

| | | | |
|---|---|---|---|
| 21,852 | 10/1858 | Ryerson | 61—69.1 |
| 569,064 | 10/1896 | Seanor et al. | 61—69.1 X |
| 908,095 | 12/1908 | Hassan | 61—69.1 |
| 1,048,194 | 12/1912 | Mitchell | 61—69.1 X |
| 1,076,820 | 10/1913 | Darssin | 61—69.1 |
| 1,349,578 | 8/1920 | Neeper | 61—69.1 |
| 1,364,337 | 1/1921 | White | 61—69.1 |
| 2,784,559 | 3/1957 | Kajmo | 61—69 |

DAVID J. WILLIAMOWSKY, *Primary Examiner.*

J. KARL BELL, *Assistant Examiner.*